July 24, 1962 H. KRONSTAD 3,045,409
AIR FILTER FOR DUST COLLECTOR
Filed Aug. 31, 1959 3 Sheets-Sheet 1
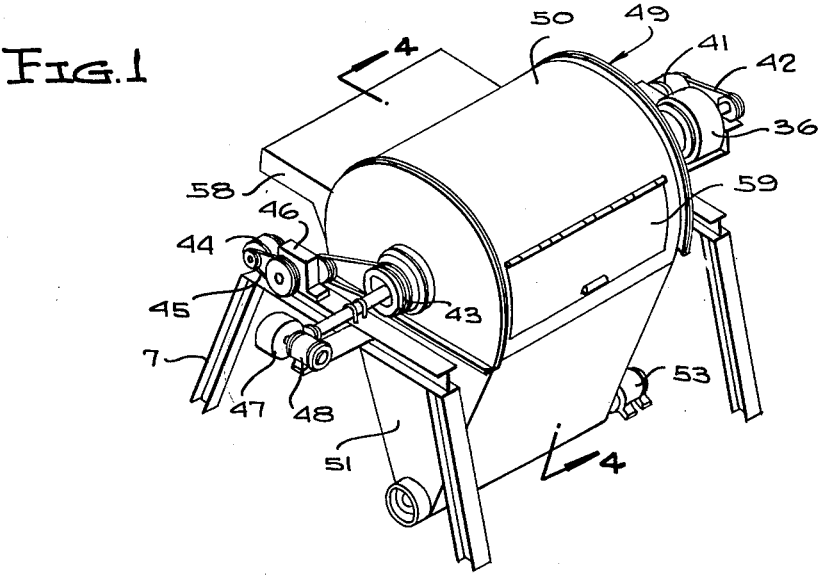
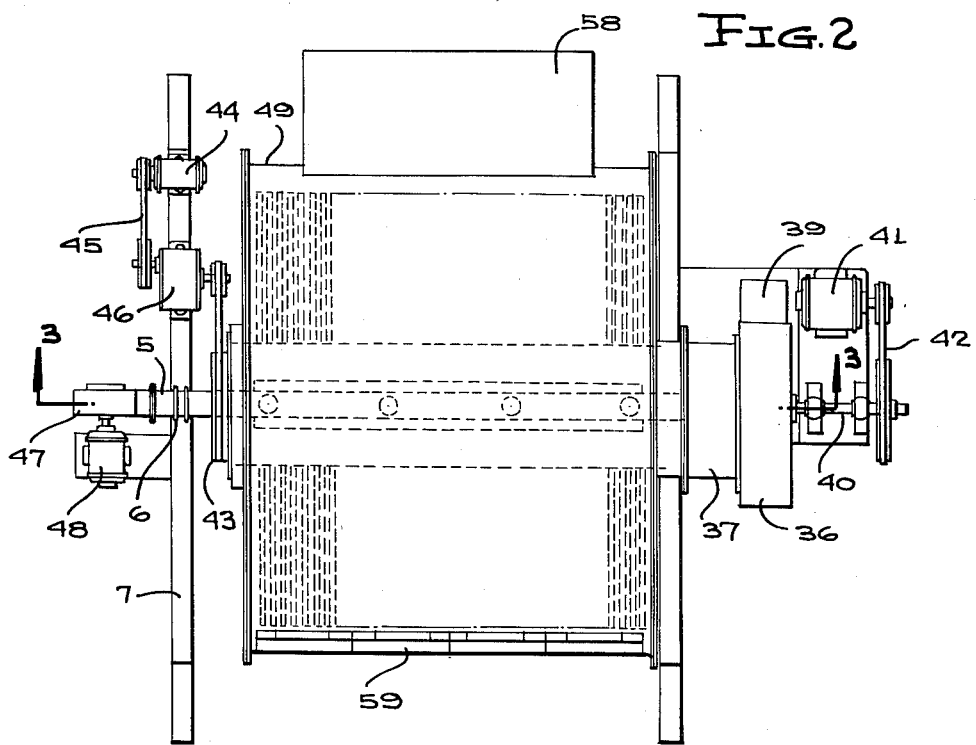
INVENTOR.
HAAVARD KRONSTAD
BY
*Ralph Burch*
ATTORNEY

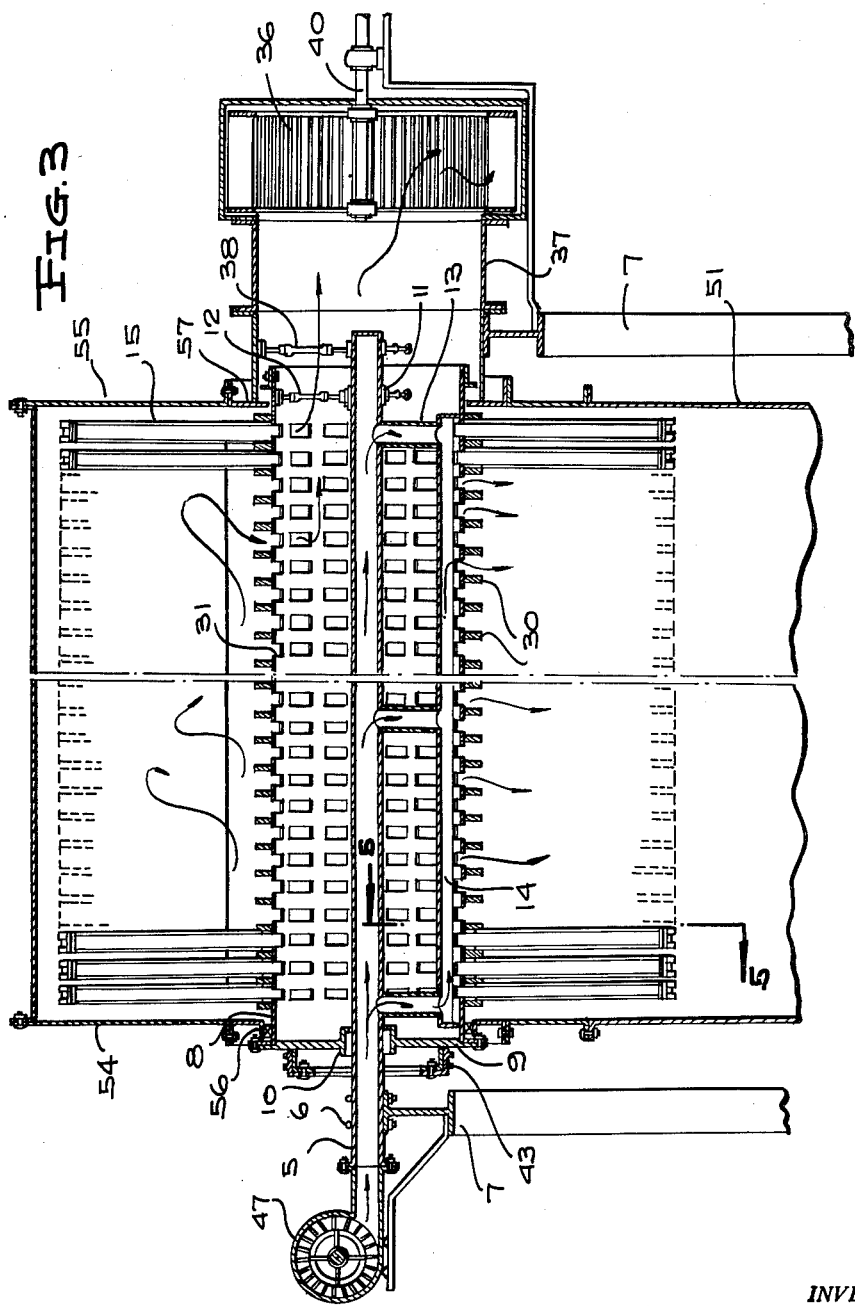

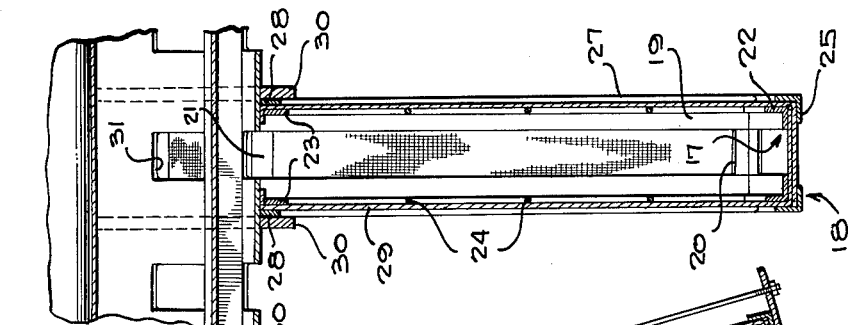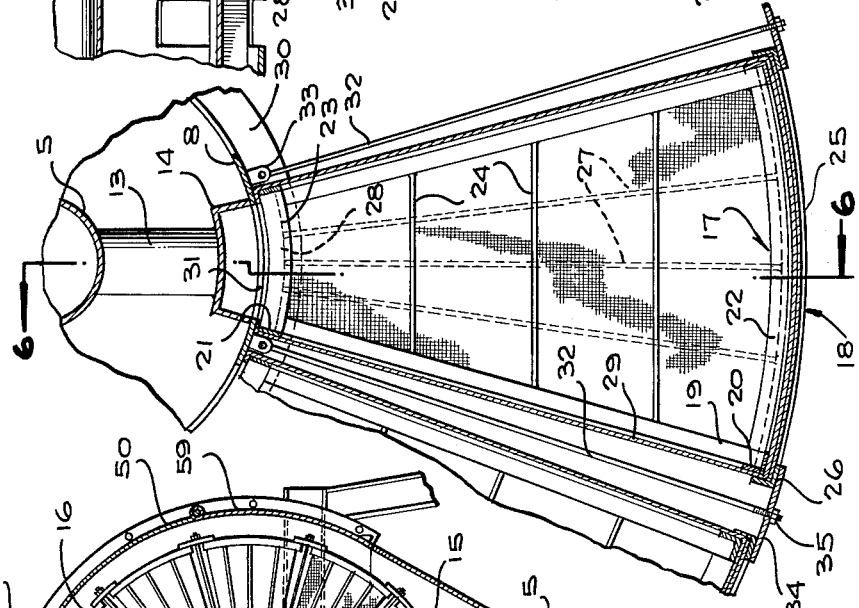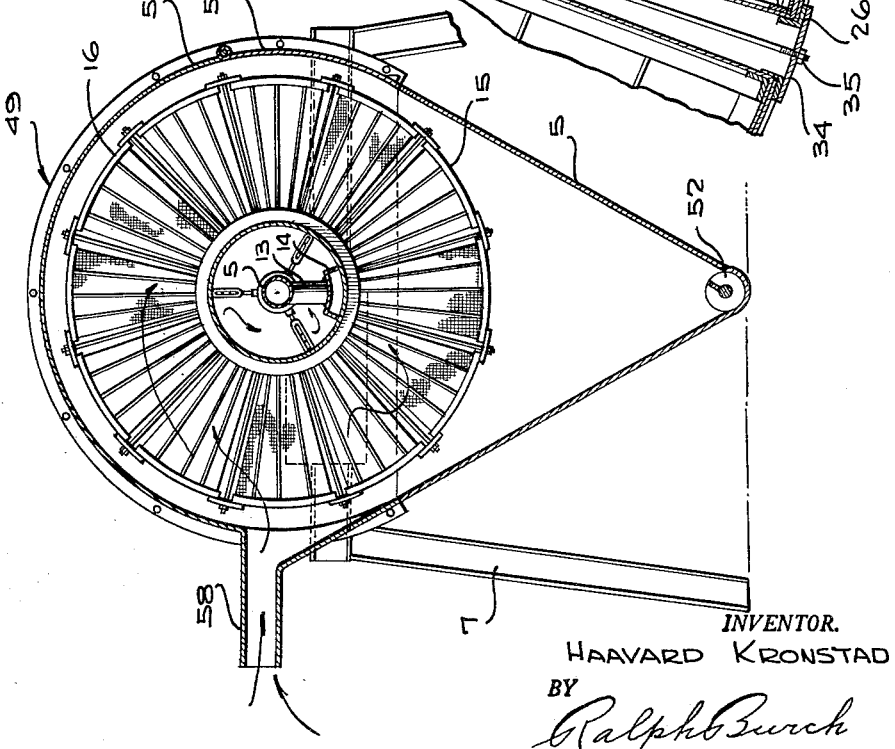

3,045,409
AIR FILTER FOR DUST COLLECTOR
Haavard Kronstad, 1479 Mount Jackson Road,
New Castle, Pa.
Filed Aug. 31, 1959, Ser. No. 837,028
2 Claims. (Cl. 55—285)

This invention relates to a dust collector for air filtering systems.

It is an object of the invention to provide a dust collector having a series of rotatable filter disks through which the dust laden air is carried by a suction of air and means for creating and discharging a current of air through the filter disks to remove the dust collected thereon.

A further object of the invention resides in providing filter disks formed of a plurality of removable segments with each segment being independently mounted to permit separate removal of the segments for cleaning or replacement.

A still further object of the invention resides in providing means for directing the current of air for removing the collected dust from the filter disks to each of the segments of the disks separately thus insuring a thorough cleaning of the disks.

Another object of the invention resides in providing a dust collector which is simple and durable in construction, reliable and efficient in operation and inexpensive to manufacture.

Other objects and advantages of the invention will be apparent during the course of the following description.

In the accompanying drawings forming a part of this specification and in which like numerals are employed to designate like parts throughout the same, FIG. 1 is a perspective view of the dust collector, FIG. 2 is a top plan view of the same, FIG. 3 is a longitudinal section taken on line 3—3 of FIG. 2, FIG. 4 is a vertical sectional view taken on line 4—4 of FIG. 1, FIG. 5 is a sectional view taken on line 5—5 of FIG. 3, showing a detail structural view of one segment of the filter disks, and, FIG. 6 is a section taken on line 6—6 of FIG. 5.

Referring to the drawings, the numeral 5 denotes a tubular pipe fixedly mounted at one end in bearing 6 mounted on one end of supporting frame 7. A drum 8 is rotatably mounted on pipe 5 having an end wall 9 with a central bearing 10 through which the pipe extends. The opposite end of the drum is open and disposed axially of the open end is a bearing 11 to receive the inner end of the pipe which is supported from the wall of the drum by a series of turnbuckles 12. The pipe 5 throughout its length is provided with a series of downwardly extending conduits 13 communicating with a manifold 14 extending longitudinally of the inner wall of the drum. A series of circular filter disks 15 are mounted on the drum 8, in spaced apart relation, each disk being formed of a plurality of independently mounted segments 16. As more clearly shown in FIG. 5, the segments comprise inner and outer frames 17 and 18. The inner frame 17 is formed of pairs of end angle bars 19 disposed to extend radially from the drum 8, the bars of each pair being disposed in spaced relation and connected at their upper ends by cross angle bars 20 and at their lower ends by cross bars 21. The pairs of end angle bars are connected together at their upper ends by arcuate angle bars 22 and at their lower ends by arcuate bars 23. The bars forming the frame 17 are braced by cross rods 24 extending between the end bars. The outer frame comprises a pair of arcuate angle bars 25 connected at their ends by cross angle bars 26, the arcuate bars 25 and cross bars 26 being adapted to closely fit over the arcuate bars 22 and cross bars 20 of the inner frame. Rods 27 extend downwardly from the arcuate bars 25 in parallel relation to the sides of the inner frame and are connected at their lower ends to arcuate bars 28 which are parallel to the arcuate bars 23 of the inner frame. Thus, it will be seen the sides of the outer frame may be spread apart when removing or placing the outer frame over the inner frame. A filter bag 29 of cloth or other suitable material is fitted over the inner frame 17 and is held thereon by the outer frame 18, being clamped between the interfitting angle bars of the frames. After the bag is fitted on the frames the segment is positioned on the drum 8 with the lower ends of the frame disposed between the flanges 30 formed on the drum and with the open end of the bag in alinement with one of the slots 31 in the drum. To retain the segments in position rods 32 are provided between the ends of the segments having their lower ends connected to brackets 33 attached to the drum and having at their upper ends plates 34 which overlap the upper ends of adjacent segments, the plates being held in clamping engagement with the segments by nuts 35 threaded on the rods.

The drum 8 is provided with a series of slots 31 establishing communication between the interior of the drum and the interior of the segments of the filter disks for the passage of air which is drawn through the filter disks by a suction fan 36 mounted in a tubular casing 37 extending from the open end of the drum. The casing 37 is supported on the inner end of pipe 5 by a turnbuckle 38 and one end of supporting frame 7 and is provided with an outlet 39 for the discharge of air. The fan 36 is mounted on a drive shaft 40 driven by a motor 41 connected with the drive shaft by a belt drive 42. Attached to the end wall 9 of drum 8 is a drive pulley 43 which is driven by motor 44 through a belt drive 45 and reduction gearing 46, to rotate the drum and filter disks. A blower fan 47 driven by a motor 48 is connected to the outer end of pipe 5 and causes a current of air to flow through the pipe 5 and conduits 13 into the manifold 14. As the drum rotates the slots 31 upon register with the manifold discharge a current of air through the segments of the filter disks, thus removing the dust from the filter cloth which is deposited in the bottom of the housing.

The drum and filter disks are completely enclosed in a housing 49, the upper half of which is semi-circular shape, as at 50, and the lower half is tapered downwardly and inwardly to form a hopper 51 having a conveyor screw 52 mounted in the bottom which is driven by a motor 53. The end walls 54 and 55 of the housing are mounted on the drum 8 and casing 37, as at 56 and 57. The upper half 50 of the housing at one side is provided with an inlet conduit 58 through which the dust laden air is introduced into the housing and at the opposite side is a hinged door 59 permitting access to the interior of the housing to remove the segments of the filter disks when it is desired to replace or clean the filter cloth.

In operation, the dust laden air enters the housing 49 through inlet conduit 58 and is drawn by the suction created by fan 36 through the filter cloths of the segments of the filter disks 15 which remove the dust from the air. After the air passes through the filter disks it passes through slots 31 into the drum 8 and is discharged through the outlet 39. As the filter disks rotate with the drum, the segments are successively brought in alinement with the manifold 14 and the slots 31 provide open communication between the manifold and segments so the current of air flowing into the manifold is discharged through the slots and impinges on the inner side of the filter cloth of the segments to remove the dust therefrom which is deposited in the bottom of the hopper 51 and discharged therefrom by the screw conveyor 52. The filter disks are spaced relatively close together to provide a large cleaning area through which the dust laden air travels permitting a large volume of air to be cleaned in a relatively small space. By providing a current of air to remove the collected dust from the filter disks as they revolve in the housing reduces the need for cleaning the filter disks to a minimum. As each disk is formed of a plurality of removable segments, a segment may be removed for replacement without having to remove the entire disk.

It is to be understood the form of my invention herein shown and described is to be taken as a preferred example of the same and certain changes in the shape, size and arrangement of the parts may be made without departing from the spirit of the invention.

Having thus described my invention, I claim:

1. A dust collector comprising a tubular shaft, a drum rotatably mounted on said shaft having circumferential and longitudinal rows of slots through its periphery throughout its length, a fixed manifold extending longitudinally of the inner wall of said drum in communication with at least one longitudinal row of slots formed in the drum, pipes connecting said manifold to said tubular shaft at spaced intervals throughout its length, a blower connected to said shaft for producing a current of air through said shaft, pipes and manifold, a casing surrounding said drum having an air inlet, a series of annular hollow filter members mounted on said drum over the rows of slots, each member being divided radially into a series of segments with each segment composed of an inner and outer frame of rectangular shape in cross section, said frames having their marginal edges interfitting together, a filter cloth covering said inner frame and secured thereon by said outer frame, means between said segments removably connecting said segments together and to said drum, means for creating a suction of air through said drum and filter members, and means for rotating said drum.

2. A dust collector comprising a housing having an air inlet, a drum rotatably mounted in said housing having circumferential rows of slots through its periphery, a series of annular hollow filter members mounted on said drum over the rows of slots, each member being divided radially into a series of segments with each segment composed of an inner and outer frame of rectangular shape in cross section, said frames having their marginal edges interfitting together, a filter cloth covering said inner frame and secured thereon by said outer frame, means between said segments removably connecting said segments together and to said drum, means for creating a suction of air through said drum and filter members and means for rotating said drum.

References Cited in the file of this patent

UNITED STATES PATENTS

| 272,474 | Prinz | Feb. 20, 1883 |
|---|---|---|
| 299,852 | Richardson | June 3, 1884 |
| 788,882 | Brantingham | May 2, 1905 |
| 1,235,581 | McHugh | Aug. 7, 1917 |
| 1,626,852 | Mangold | May 3, 1927 |
| 2,732,912 | Young | Jan. 31, 1956 |
| 2,867,288 | Turner | Jan. 6, 1959 |

FOREIGN PATENTS

| 704 | Great Britain | Feb. 8, 1883 |
|---|---|---|
| 14,214 | Great Britain | Oct. 19, 1887 |
| 369,631 | Germany | Feb. 22, 1923 |